United States Patent
Regalado

[19]

[11] Patent Number: 5,886,420
[45] Date of Patent: Mar. 23, 1999

[54] AUTOMOTIVE ANTI-THEFT DEVICE WHICH DISABLES THE DISTRIBUTOR BY FRACTURING ITS ROTOR

[76] Inventor: Samuel G. Regalado, 898 Blackwood Dr., San Diego, Calif. 92154

[21] Appl. No.: 620,497

[22] Filed: Mar. 22, 1996

[51] Int. Cl.$^6$ .................................................. B60R 25/04
[52] U.S. Cl. ................................ 307/10.3; 123/146.5 B; 180/287
[58] Field of Search ................................ 307/9.1–10.6; 361/160, 170, 250, 253; 123/149 E, 146.5 B, 198 DB, 198 B, 198 DC; 180/287; 340/425.5, 430, 825.31, 825.32, 825.69, 825.72; 327/525

[56] References Cited

U.S. PATENT DOCUMENTS

| | | | |
|---|---|---|---|
| 4,123,745 | 10/1978 | Gurgone | 307/10.3 |
| 4,207,850 | 6/1980 | Wharton | 123/146.5 B |
| 4,452,197 | 6/1984 | Weber | 123/198 B |
| 4,553,511 | 11/1985 | Hayakawa et al. | 123/198 B |
| 4,653,605 | 3/1987 | Goren et al. | 180/287 |
| 5,477,090 | 12/1995 | Davis | 307/10.5 |

OTHER PUBLICATIONS

*Immobiliser* Brochure, Quorum International, Ltd., Nov. 1992, 2 pages.

*Primary Examiner*—William M. Shoop, Jr.
*Assistant Examiner*—Richard T. Elms
*Attorney, Agent, or Firm*—John J. Connors; Connors & Assoc.

[57] ABSTRACT

An anti-theft device disables the engine of an automotive vehicle during an attempted robbery by breaking the rotor of the engine's distributor. The distributor has a plurality of electrodes and the rotor is moved through a circular path during operation of the engine to make electrical contact with the electrodes to generate sparks in the engine's combustion chamber. A stopper element mounted to be moved between a first position where the stopper element is in the path of the rotor and a second position where the stopper element is displaced from the path of the rotor. A solenoid selectively moves the stopper element between the first and second positions by manual actuating a hidden switch. The rotor is made of a material which fractures upon engaging the stopper element, so that, with the stopper element in the rotor's path, the rotor is fractured to prevent contact with the electrodes and the generation of sparks.

10 Claims, 3 Drawing Sheets

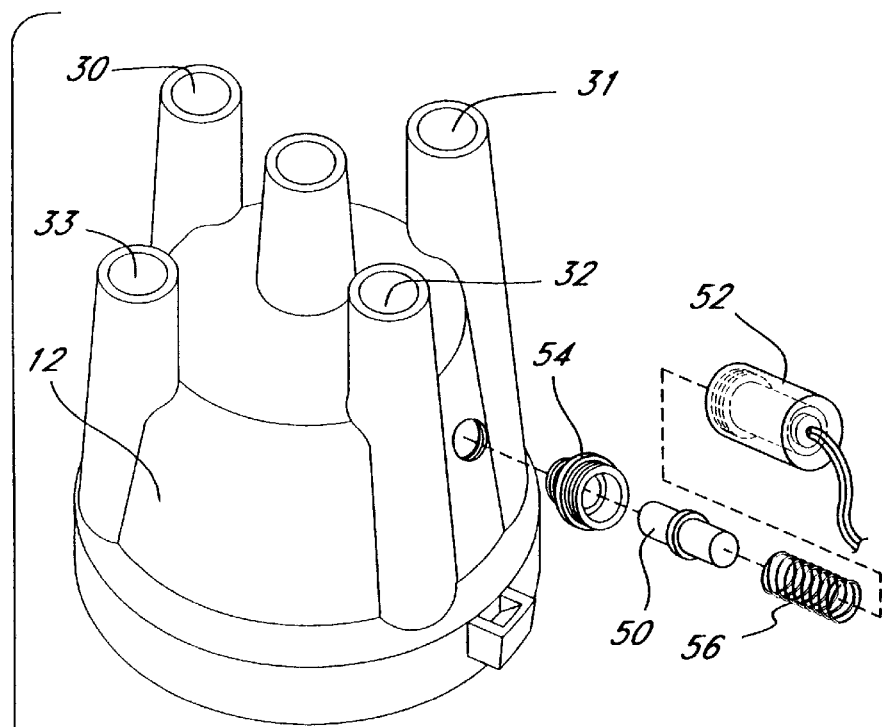
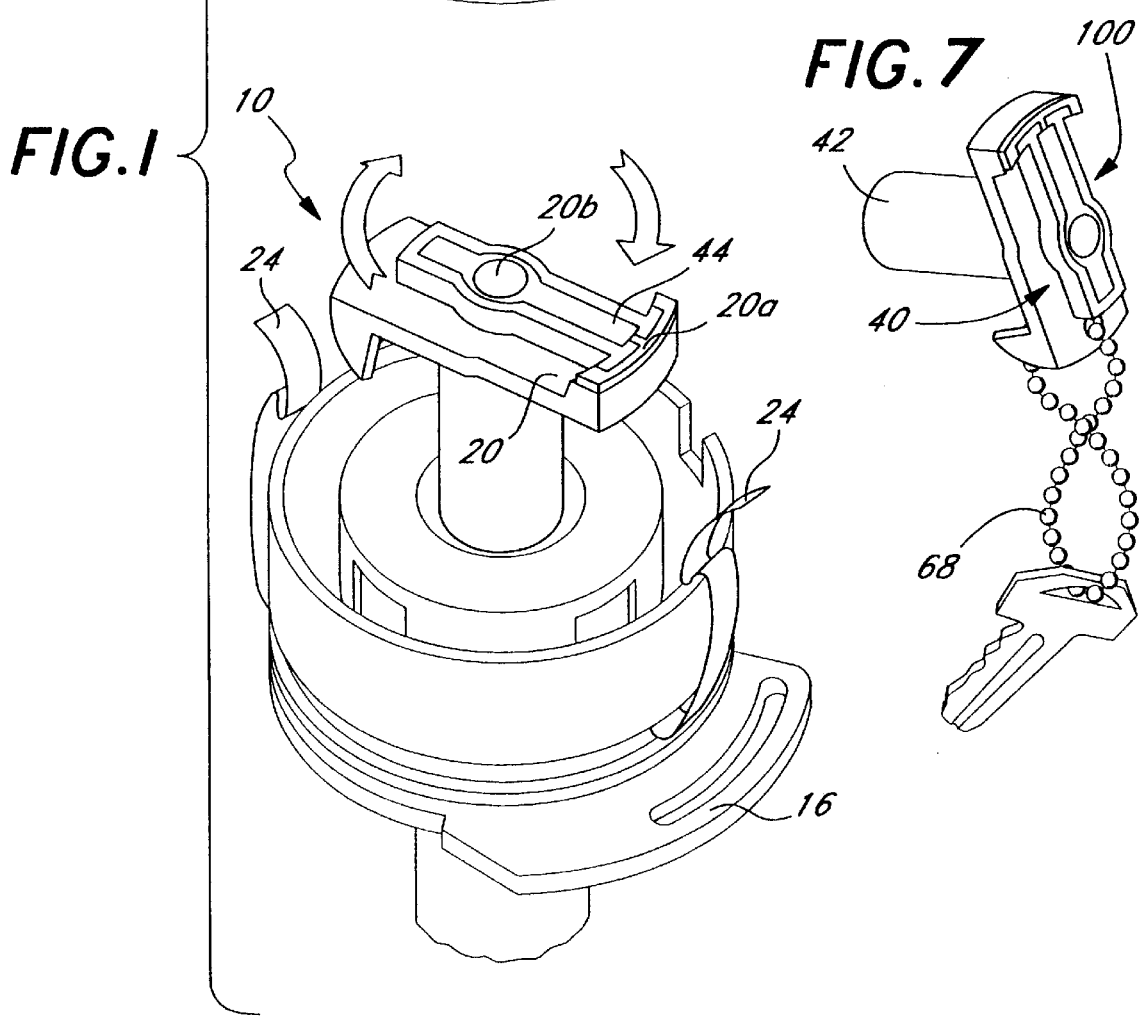

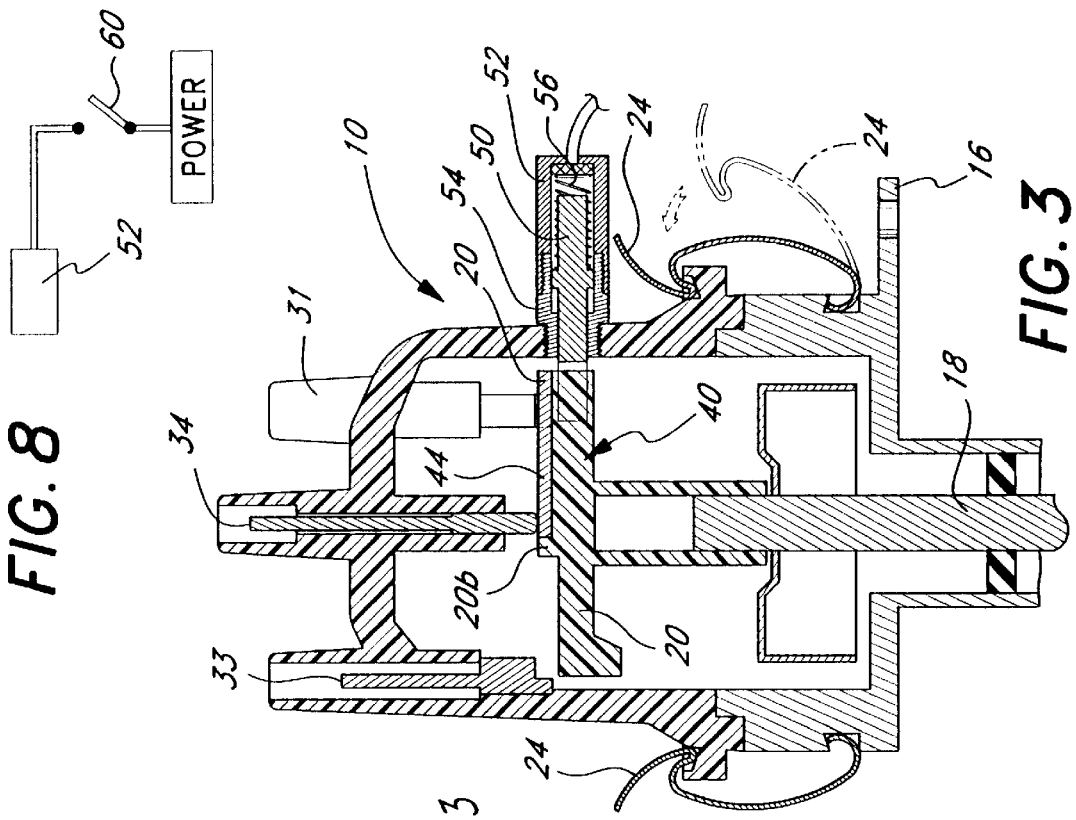
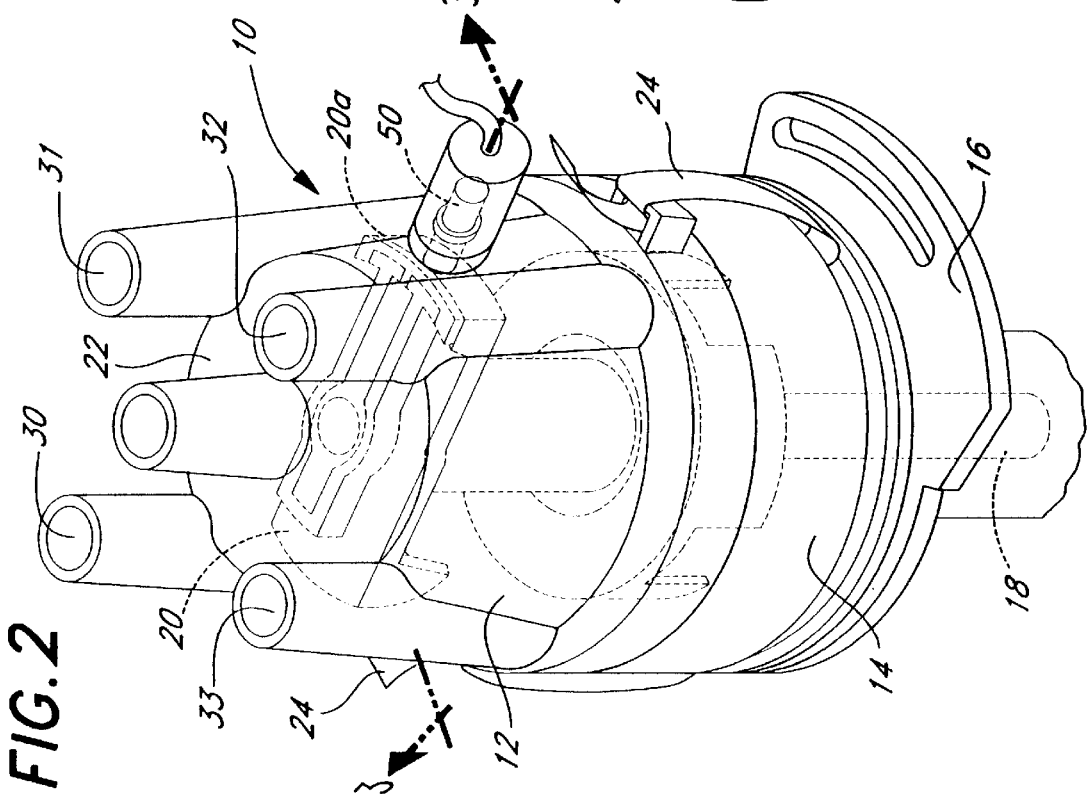

AUTOMOTIVE ANTI-THEFT DEVICE WHICH DISABLES THE DISTRIBUTOR BY FRACTURING ITS ROTOR

BACKGROUND OF THE INVENTION

1. Field of the Invention

This invention relates to an anti-theft device for an automotive vehicle. In particular, it relates to an anti-theft device which breaks the rotor of a distributor, thereby preventing degeneration of sparks which ignite the air-fuel mixture fed to the internal combustion chamber of the vehicle's engine.

2. Background Discussion

Automotive theft is a serious problem. There are many automotive anti-theft devices available, but most are expensive and difficult to install. Many are elaborated electronic tracking systems that provide a homing signal that allows the police to locate the stolen vehicle. These require a high level of technical expertise to install and maintain. Some are simple mechanical locks for the steering wheel, which are quickly removed by professional thieves. Others are simply alarms, making a loud noise. It would be highly desirable to provide an inexpensive automotive anti-theft device which is simple to install, requires no maintenance, and is highly reliable and not easily circumvented.

SUMMARY OF THE INVENTION

The objective of this invention to provide an inexpensive, easy to install automotive anti-theft device that disables the vehicle upon an attempted robbery.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include preventing automotive vehicle theft by means of an inexpensive, simple to install device.

The first feature of the anti-theft device of this invention is that it disables the engine of an automotive vehicle during an attempted robbery by preventing spark generation which ignites the air-fuel mixture of the vehicle's internal combustion engine. It includes a conventional distributor, modified in accordance with this invention, for generating electrical sparks for engine ignition.

The second feature is that the distributor has a plurality of electrodes and an electrode contact, the rotor, which is moved through a predetermined path during operation of the engine to make electrical contact with the electrodes to generate sparks. The rotor is removably mounted on a rotatable drive shaft that is initially turned by the vehicle's starter motor. This drive shaft is rotated to move the rotor through a circular path, so that the rotor sequentially contacts the electrodes.

The third feature is a stopper element mounted to be moved between a first position where the stopper element is in the path of the electrode contact and a second position where the stopper element is displaced from the path of the electrode contact. An actuator mechanism selectively moves the stopper element between the first and second positions. The actuator mechanism may include a solenoid that is activated and deactivated by manual manipulation of a switch, which will typically be hidden from view, with only the legitimate vehicle operator knowing its location in or on the vehicle. The solenoid moves the stopper member between the first and second positions.

The fourth feature is that the electrode contact is made of a material which fractures upon engaging the stopper element. Consequently, with the stopper element in the rotor's path, the rotor is fractured to prevent contact with the electrodes and the generation of sparks. Typically, the material is a polymeric material such as, for example, a phenolic resin. The distributor has a removable cover to provide access to the fractured rotor. Because the rotor is removably mounted on the drive shaft, the fractured rotor is simply manually removed by the legitimate operator of the vehicle and replaced with a new rotor. Since the rotor is light weight and only a few inches in length, an extra rotor may be carried by the legitimate operator, for example, on a key chain or in a purse.

DESCRIPTION OF THE DRAWING

The preferred embodiment of this invention, illustrating all its features, will now be discussed in detail. This embodiment depicts the novel and non-obvious anti-theft device of this invention as shown in the accompanying drawing, which is for illustrative purposes only. This drawing includes the following figures (Figs.), with like numerals indicating like parts:

FIG. 1 is an exploded perspective view of the anti-theft device of this invention which is incorporated into a conventional distributor used in generating electrical sparks for the internal combustion engine of an automotive vehicle.

FIG. 2 is a perspective view of the assembled anti-theft device of this invention.

FIG. 3 is a cross-sectional view taken along line 3—3 of FIG. 2.

FIG. 7 is a perspective view of a replacement rotor carried on a key chain.

FIG. 8 is a schematic electrical circuit for the anti-theft device of this invention.

DETAILED DESCRIPTION OF THE PREFERRED EMBODIMENT

Figure 4:
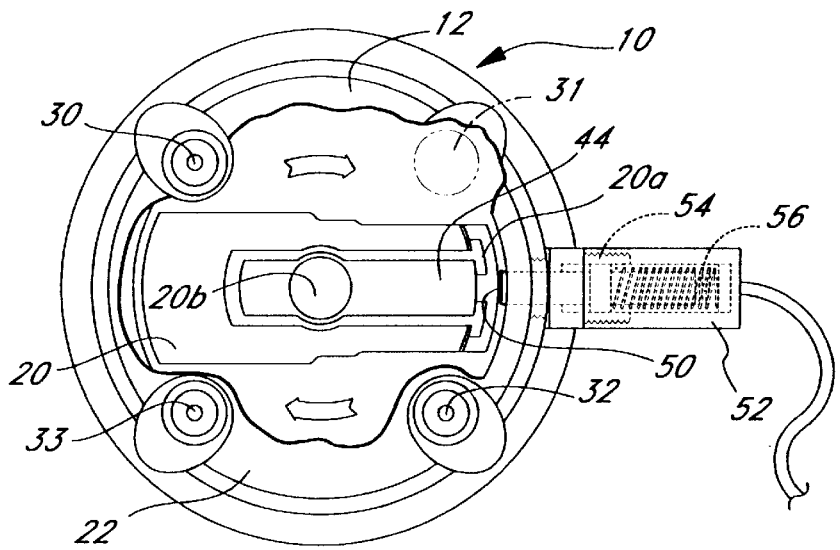
FIG. 4 is a top plan view of the device shown in FIG. 2, with sections broken away, showing the rotor of the distributor as it revolves during operation of the internal combustion engine of an automotive vehicle with the anti-theft device of this invention deactivated.

As best illustrated in FIGS. 1–3, the anti-theft device 10 of this invention is incorporated into a conventional distributor 12 used with an internal combustion engine (not shown) to generate sparks. A typical distributor 12 is manufactured by the well known auto parts manufacturer Bosch. This distributor 12 includes a base 14 which has a flange 16 that allows the distributor 12 to be attached to the internal combustion engine. This base 14 has a drive shaft 18 (FIG. 3) extending upward that carries a rotor 20, an electrode contract. A cover 22 is removably attached to the base 14, being held in position by clips 24 extending upward from the base 14. With the clips 24 in the position shown in solid lines, the cover 22 is secured to the base 14. By manually pushing the clips 24 away from the cover 22 to the position shown in dotted lines, the cover 22 may be removed by simple lifting it off the base 14 to provide access to the rotor 20.

The rotor 20 is a molded plastic piece which has a top electrode contact section 40 disposed generally at a right angle to a hollow cylindrical element 42 which extends downward from the center of the electrode contact section. The electrode contact section 40 has a conductive strip 44 extending between the central section 20b of the rotor 20 and the outer metallic end 20a of the rotor 20. The hollow cylindrical element 42 has an inside diameter approximately equal to the outside diameter of the drive shaft 18, allowing the rotor 20 to fit snug on the shaft but permitting manual removal of the rotor 20 by pulling it, or prying it, off the drive shaft.

There are, for example, five electrodes carried in the cover 22, four peripheral electrodes 30 through 33 which are spaced apart and disposed along a circular path that the rotor 20 follows when the drive shaft 18 is rotated, and a central electrode 34. The terminal ends of these electrodes 30–34, ends 33a, 31a, and 34a shown in FIG. 3, make contact with the rotor 20. The terminal ends of the peripheral electrodes 30 through 33 make momentary contact in sequence with the outer metallic end 20a of the rotor 20 as the rotor revolves upon rotation of the drive shaft 18. The terminal end 34a of the central electrode 34 maintains continual contact with the central metallic section 20b of the rotor 20 during rotation of the rotor. Individual wires (not shown) connect the central electrode 34 with the peripheral electrodes, and an electrical circuit is completed as the rotor 20 sequentially contracts the peripheral electrodes 30–33, thereby producing sparks in sequence. With the generation of a spark, the air-fuel mixture in one of the combustion chambers or cylinders (not shown) of the vehicle is ignited.

One novel feature of this invention is the use of a stopper element 50 that is selectively positioned in the circular path of the rotor 20. This stopper element 50 comprises a rigid metal bar which it is one component of a solenoid 52 that is attached to the cover 22. There is a retainer piece 54 that has one threaded end screwed into the cover 22 and another threaded end which is screwed into a housing 52a for the solenoid 52. There is a spring 56 mounted in the housing 52a which normally is biased to pull the stopper element 50 into the housing so that it is displaced from the circular path of the rotor 20 as illustrated in FIG. 4. Thus, the rotor 20 will normally function in the usual manner, causing sparks to be sequentially generated as it sweeps past the electrodes 30–33 in the cover 22.

Figure 5:
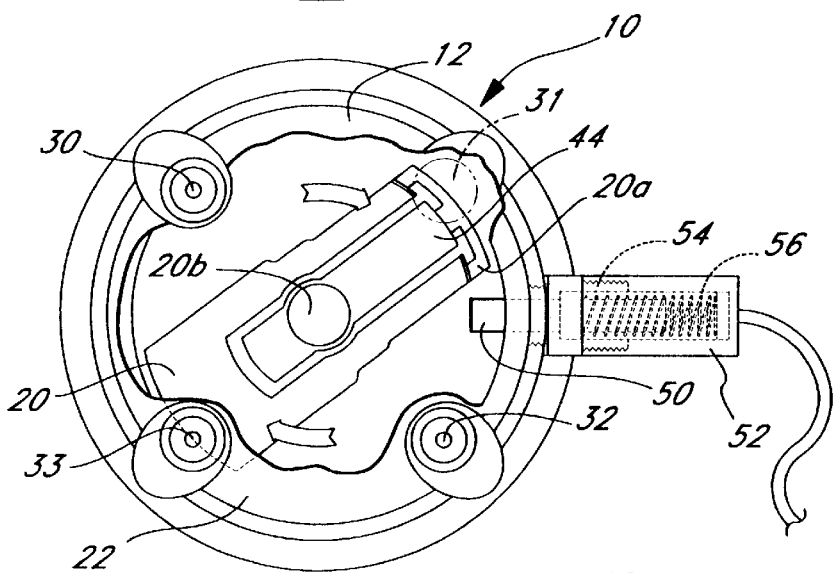
FIG. 5 is a top plan view similar to that shown in FIG. 4, but with the anti-theft device of this invention activated.
Figure 6:
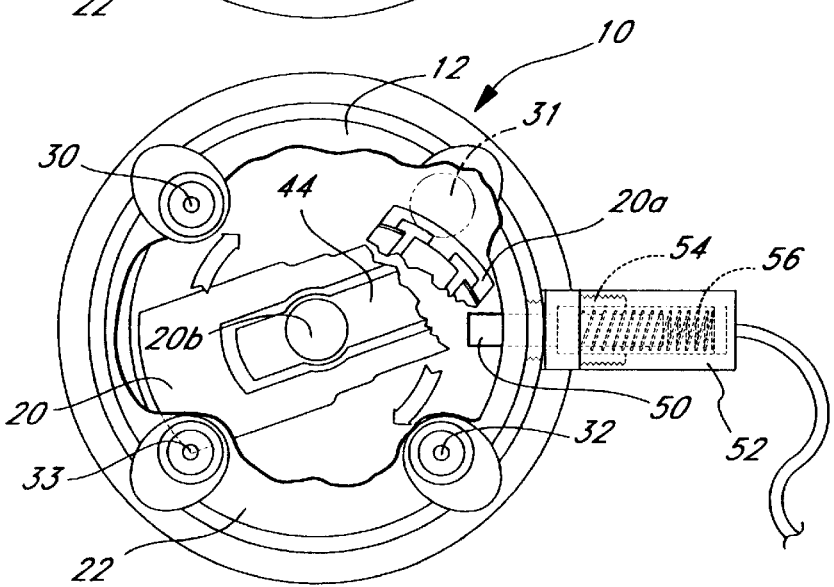
FIG. 6 is a top plan view similar to that shown in FIG. 4 showing the rotor being fractured to disable the internal combustion engine by terminating spark generation.

To activate the anti-theft device, a switch 60 (FIG. 8) is closed to energize the solenoid 52 which pushes the stopper element 50 outward into the path of the rotor 20 as illustrated in FIG. 5. This switch 60 is typically hidden inside the automotive vehicle and is manually activated by the legitimate operator upon leaving the vehicle parked in a non-attended parking space. With the stopper element 50 in the path of the rotor 20, the rotor will contact the stopper element 50 and fracture as illustrated in FIG. 6. The rotor 20 element is made from a polymer material such as, for example, that is easily fractured under the normal operating conditions of the vehicle as the drive shaft 18 turns. As soon as the rotor 20 is broken, the electrical contact is discontinued and there is no longer a closed circuit between the central electrode 34 and one of the peripheral electrodes 30–33, thereby preventing generation of sparks. The lack of sparks prevents the engine from operating and prevents the theft.

Since the distributor cover 22 and rotor 20 are both removable, the legitimate operator of the vehicle upon returning and discovering that the engine will not start, simply removes the cover 22 and replaces the fractured rotor 20 with a new rotor 100. The operator may carry a replacement rotor 20 on, for example, his or her key chain 68.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover 22 all modifications and alternate constructions coming within the spirit and scope of the invention as generally expressed by the following claims, which particularly point out and distinctly claim the subject matter of the invention:

I claim:

1. An anti-theft device which disables the engine of an automotive vehicle during an attempted robbery, including
    a distributor which generates electrical sparks for engine ignition,
    said distributor having a plurality of electrodes and an electrode contact which is moved through a predetermined path during operation of the engine to make electrical contact with the electrodes to generate said sparks,
    a stopper element mounted to be moved between a first position where the stopper element is in the path of the electrode contact and a second position where the stopper element is displaced from the path of the electrode contact, and
    an actuator mechanism which selectively moves the stopper element between the first and second positions,
    said electrode contact made of a material which fractures upon engaging the stopper element, so that, with the stopper element in said path, the electrode contact is fractured to prevent contact with the electrodes and the generation of said sparks.

2. The anti-theft device of claim 1 where the electrode contact is a rotor member mounted on a rotatable drive shaft.

3. The anti-theft device of claim 2 where the drive shaft is rotated to move said rotor member through a circular path, so that said rotor member sequentially contacts said electrodes.

4. The anti-theft device of claim 1 where the electrode contact is removably mounted, enabling the fractured electrode contact to be removed and replaced.

5. The anti-theft device of claim 4 where the distributor has a removable cover which upon removal provides access to the fractured electrode contact.

6. An anti-theft device which disables the engine of an automotive vehicle during an attempted robbery, including
    a distributor which generates electrical sparks for engine ignition,
    said distributor having a plurality of electrodes and a rotor member which is mounted on a rotatable drive shaft that is driven during operation of the engine to rotate the rotor member through a predetermined circular path, so that the rotor member sequentially contacts the electrodes which are disposed along said path, thereby generating said sparks, a stopper element mounted to be moved between a first position where the stopper element is in said path of the rotor member and a second position where the stopper element is displaced from the path of the rotor member, and an actuator mechanism which selectively moves the stopper element between the first and second positions, said rotor member made of a material which fractures upon engaging the stopper element, so that, with the stopper element in said path, the rotor member is fractured to prevent contact with the electrodes and the generation of said sparks.

7. The anti-theft device of claim 6 where the rotor member is removably mounted on said drive shaft, enabling the fractured rotor member to be removed and replaced.

8. The anti-theft device of claim 7 where the distributor has a removable cover which upon removal provides access to the fractured rotor member.

9. The anti-theft device of claim 6 where the actuator mechanism includes a solenoid member that is activated and deactivated by manual manipulation of a switch, said solenoid member moving the stopper member between the first and second positions.

10. An anti-theft device which disables the engine of an automotive vehicle during an attempted robbery, including a distributor which generates electrical sparks for engine ignition, said distributor having a plurality of electrodes, a rotor member which is mounted on a rotatable drive shaft, and a removable cover which upon removal provides access to the rotor member, said drive shaft being driven during operation of the engine to rotate the rotor member through a predetermined circular path, so that the rotor member sequentially contacts the electrodes which are disposed along said path, thereby generating said sparks, on said drive shaft, a stopper element mounted to the cover, said stopper element being moveable between a first position where the stopper element is in said path of the rotor member and a second position where the stopper element is displaced from the path of the rotor member, and an actuator mechanism which selectively moves the stopper element between the first and second positions, said actuator including a member that is activated and deactivated by manual manipulation of a hidden switch, said rotor member
   (i) made of a polymeric material which fractures upon engaging the stopper element, so that, with the stopper element in said path, the rotor member is fractured to prevent contact with the electrodes and the generation of said sparks, and
   (ii) removably mounted, enabling the fractured rotor member to be removed and replaced.

* * * * *